United States Patent [19]

Hasegawa et al.

[11] Patent Number: 5,736,836
[45] Date of Patent: Apr. 7, 1998

[54] BATTERY DISCHARGE GAS CONTROL SYSTEM

[75] Inventors: Osamu Hasegawa; Tatsurou Horie; Yasuyuki Sando; Toshihiro Sone; Kazuhiko Yagi; Yuichi Nakamura; Hiromitsu Sato, all of Wako, Japan

[73] Assignee: Honda Giken Kogyo Kabushiki Kaisha, Tokyo, Japan

[21] Appl. No.: 826,825

[22] Filed: Apr. 8, 1997

[30] Foreign Application Priority Data

Apr. 10, 1996 [JP] Japan ................................ 8-088629

[51] Int. Cl.⁶ .............................. H02J 7/04; H02J 7/00
[52] U.S. Cl. .............................. 320/46; 320/2; 320/5
[58] Field of Search .................. 320/46, 2, 5; 429/57–60

[56] References Cited

U.S. PATENT DOCUMENTS

| 3,906,330 | 9/1975 | Salamon et al. | 320/46 |
| 4,782,279 | 11/1988 | Selanger | 320/46 |
| 5,488,285 | 1/1996 | Hosobuchi | 320/46 |
| 5,650,711 | 7/1997 | Kang | 320/46 |

FOREIGN PATENT DOCUMENTS 60-246574  12/1985  Japan .

*Primary Examiner*—Peter S. Wong
*Assistant Examiner*—K. Shin
*Attorney, Agent, or Firm*—Armstrong, Westerman, Hattori, McLeland & Naughton

[57] ABSTRACT

A battery discharge gas control system, which releases a hydrogen gas generated from the battery assembly when the battery assembly is charged and discharged, is capable of keeping the battery structure highly resistant to water or humidity. The battery discharge gas control system has a battery having a gas release port, a passage connected to the gas release port, a control valve connected to the passage, a pressure sensor for detecting a pressure in the passage, and a control circuit for opening the control valve to release a gas generated by the battery from the passage, depending on the pressure in the passage as detected by the pressure sensor. During a period of time in which no hydrogen gas is generated or a generated hydrogen gas is not plenty enough to be released while the battery is being charged or discharged, the passage is closed for thereby keeping the battery structure highly resistant to water or humidity. The control valve has a solenoid-operated valve openable in response to a control signal outputted by the control circuit, and a relief valve mechanically openable depending on the pressure in the passage. Even in the event of a failure of the solenoid-operated valve, the relief valve is mechanically opened depending on the pressure in the passage, thereby protecting the passage from damage.

11 Claims, 8 Drawing Sheets

BATTERY DISCHARGE GAS CONTROL SYSTEM

BACKGROUND OF THE INVENTION

1. Field of the Invention

The present invention relates to a battery discharge gas control system, and more particularly to a battery discharge gas control system which is capable of safely and effectively releasing a hydrogen gas which is generated from a battery such as a storage gas mounted on an electric vehicle or the like when the battery is charged and discharged, while keeping a battery structure resistant to water or humidity.

2. Description of the Related Art

Recent years have seen much attention attracted to electric vehicles as pollution-free mobile units. Generally, electric vehicles have an electric motor as a propulsion source and a storage battery which energizes the electric motor. Since the electric motor consumes a large amount of electric energy and various other devices such as electric accessories mounted on the electric vehicle also consume a large amount of electric energy, they are supplied with required electric energy from a battery assembly which comprises a plurality of series-connected battery cells.

One battery which has recently been proposed as such a battery assembly is an NiMH battery. The secondary cells of the NiMH battery discharge a hydrogen gas when they are charged and discharged. Therefore, many apparatus, including electric vehicles, which employ an NiMH battery incorporate a discharge gas control system for releasing a generated hydrogen gas.

Japanese laid-open patent publication No. 60-246574, for example, discloses a discharge gas control system for releasing a hydrogen gas which is generated when a battery is charged and discharged. The disclosed discharge gas control system has a solenoid-operated valve disposed in a gas release port in the battery for selectively opening and closing the gas release port, and a valve controller for opening the solenoid-operated valve to release the hydrogen gas when the battery is charged.

During a period of time in which no hydrogen gas is generated or a generated hydrogen gas is not plenty enough to be released while the battery is being charged or discharged, it is not necessary to open the solenoid-operated valve. Rather, it is preferable during such a period of time to close the solenoid-operated valve for thereby keeping the battery structure.

In the conventional discharge gas control system, however, the solenoid-operated valve is opened to discharge a generated hydrogen gas when the battery is charged. The solenoid-operated valve remains open even if no hydrogen gas is generated when the battery is charged. While the solenoid-operated valve is being open, the battery structure is less resistant to water or humidity than while the solenoid-operated valve is being closed. Consequently, since the solenoid-operated valve is opened during a period of time in which no hydrogen gas needs to be released, the ability of the battery structure to be resistant to water or humidity is adversely affected during such a period of time.

Another problem of the conventional discharge gas control system is that in the event of an undesired failure of the solenoid-operated valve, no hydrogen gas can be released, resulting in an abnormal gas pressure buildup in and hence a possibility of unwanted damage to a passage connected to the gas release port of the battery.

SUMMARY OF THE INVENTION

It is a general object of the present invention to provide a battery discharge gas control system for releasing a hydrogen gas generated from a battery when the battery is charged and discharged, the battery discharge gas control system being capable of keeping a battery structure highly resistant to water or humidity.

A primary object of the present invention is to provide a battery discharge gas control system which, if the gas pressure in a passage connected to a gas release port of a battery is detected by a pressure sensor as being lower than a predetermined pressure level during a period of time in which no hydrogen gas is generated or a generated hydrogen gas is not plenty enough to be released while the battery is being charged or discharged, closes the passage for thereby keeping a battery structure highly resistant to water or humidity.

Another object of the present invention is to provide a battery discharge gas control system which, during a period of time in which no hydrogen gas is generated or a generated hydrogen gas is not plenty enough to be released while a battery is being charged or discharged, intermittently opens a solenoid-operated valve thereby to keep a battery Structure highly resistant to water or humidity.

Still another object of the present invention is to provide a battery discharge gas control system which, in the event of a failure of a solenoid-operated valve, operates valve means depending the gas pressure in a passage connected to a gas release port of a battery to mechanically open the solenoid-operated valve for thereby protecting the passage from damage.

Yet still another object of the present invention is to provide a battery discharge gas control system which, during a period of time in which no hydrogen gas is generated or a generated hydrogen gas is not plenty enough to be released while a battery is being charged or discharged, intermittently opens a solenoid-operated valve thereby to keep a battery structure highly resistant to water or humidity, and which reduces the amount of a hydrogen gas generated per unit time for thereby lowering the concentration of the hydrogen gas in the vicinity of a gas release port (explosion-resistant filter) of the battery.

A further object of the present invention is to provide a battery discharge gas control system which makes highly resistant to water or humidity a battery assembly that comprises a plurality of battery cells and a passage connected to gas release ports of the respective battery cells, and which, in the event of a failure of a solenoid-operated valve for opening and closing the passage, can mechanically close the passage to prevent an unwanted gas pressure buildup from being developed in the passage thereby to avoid damage to the passage.

The above and other objects, features and advantages of the present invention will become more apparent from the following description when taken in conjunction with the accompanying drawings in which a preferred embodiment of the present invention is shown by way of illustrative example.

3

Figure 5:
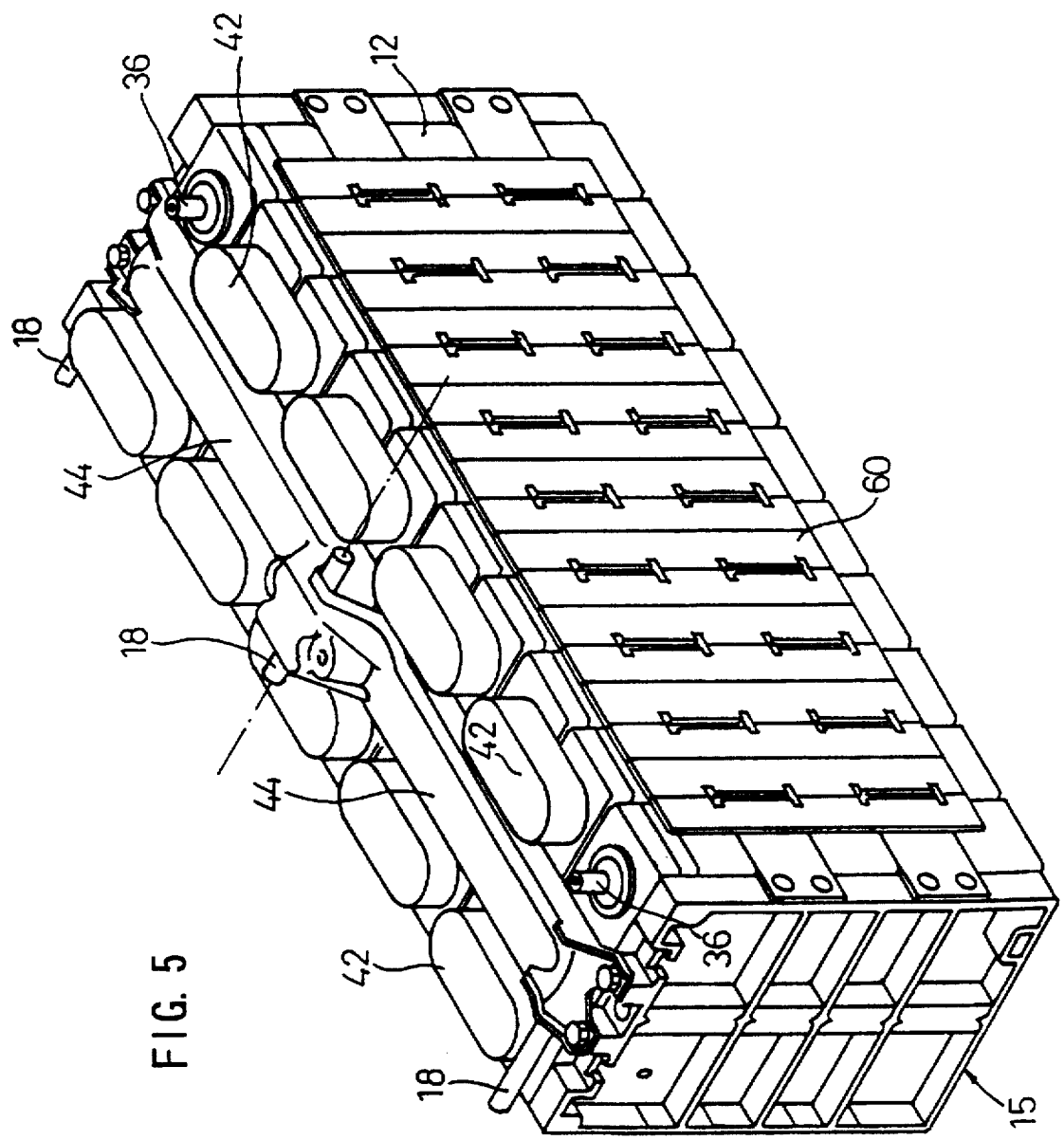
Figure 6:
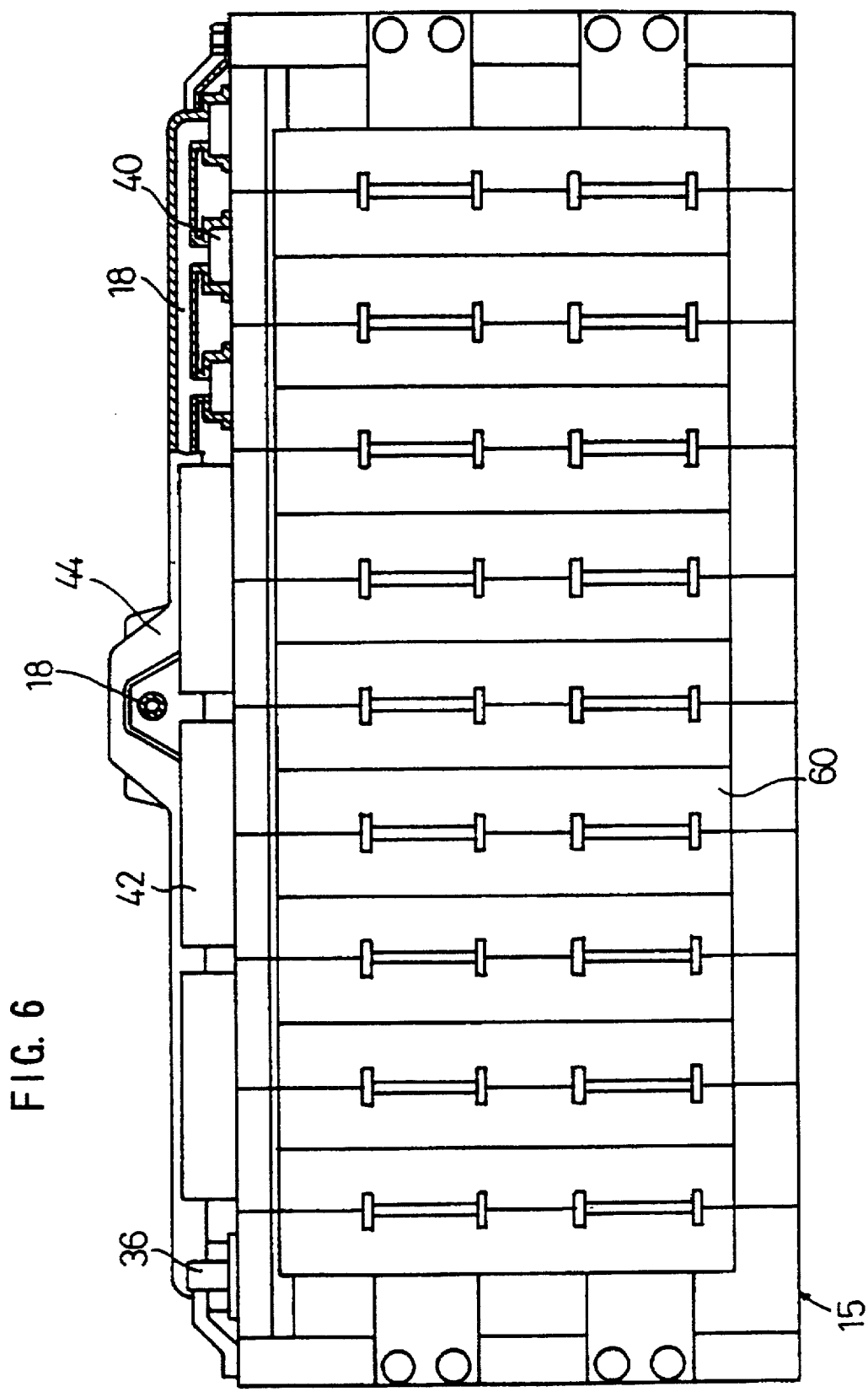
Figure 7:
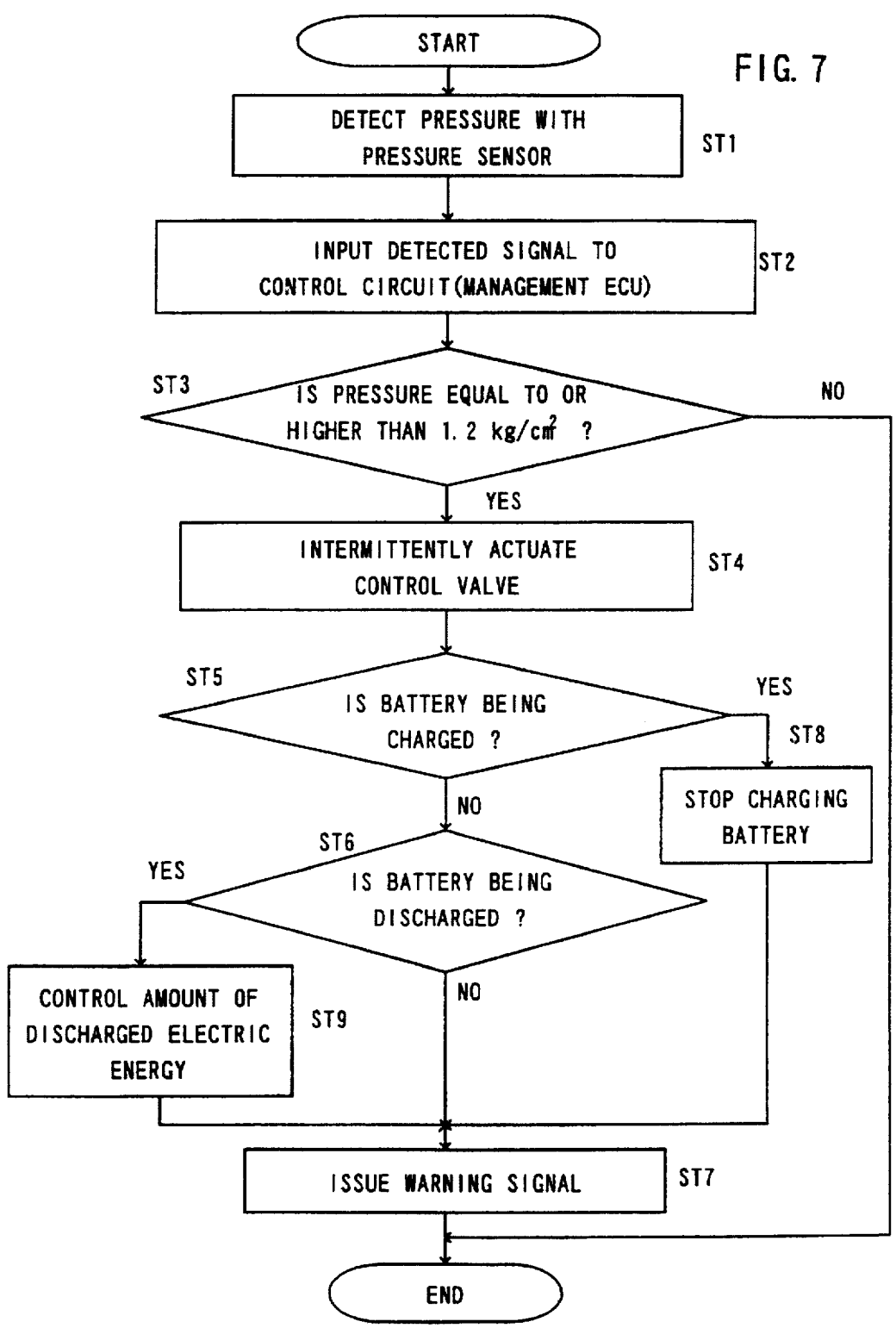
Figure 8A:
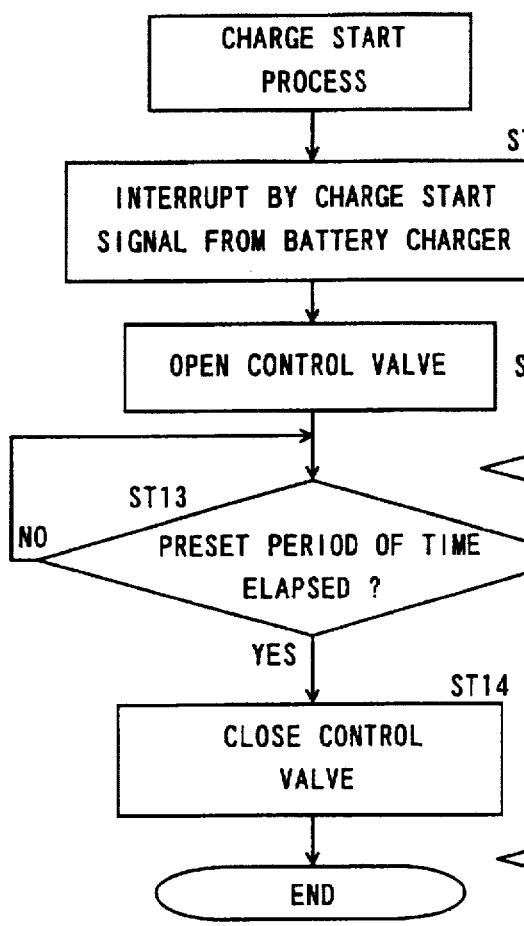
Figure 8B:
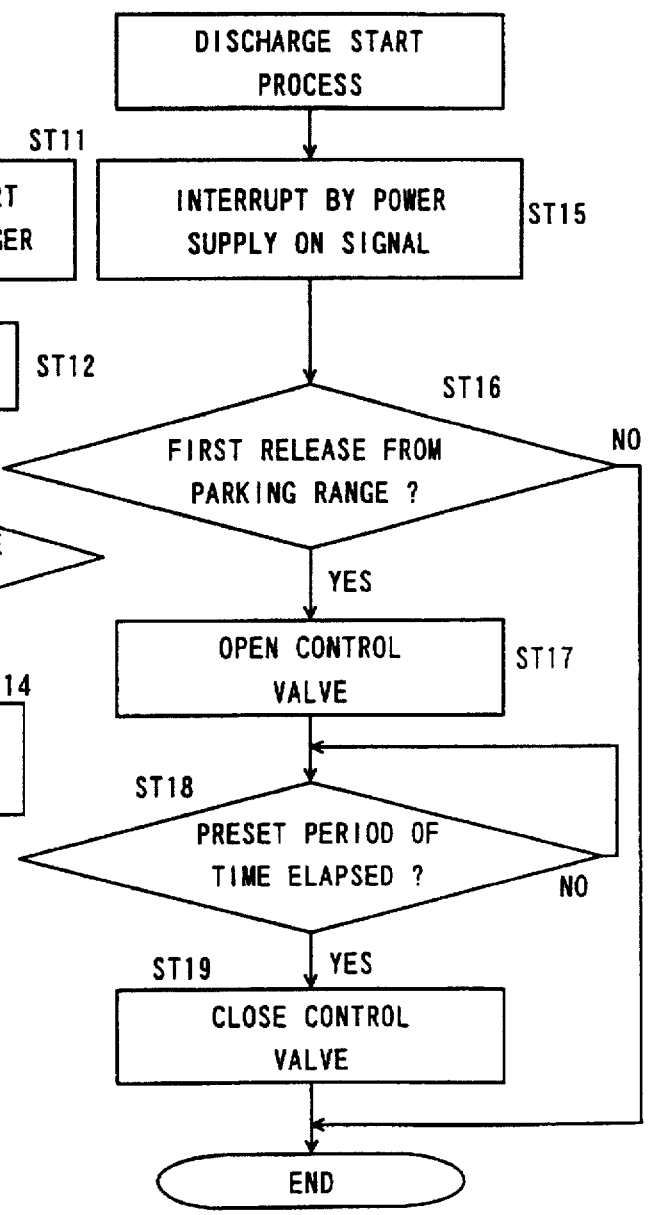

FIG. 5 is a perspective view of the battery cells with a portion of the gas discharge system installed thereon;

FIG. 6 is a side elevational view, partly in cross section, of the battery cells;

FIG. 7 is a flowchart of an operation sequence of the battery discharge gas control system according to the present invention; and FIGS. 8A and 8B are flowcharts of other operation sequences of the battery discharge gas control system according to the present invention.

DETAILED DESCRIPTION OF THE PREFERRED EMBODIMENT

Figure 1:
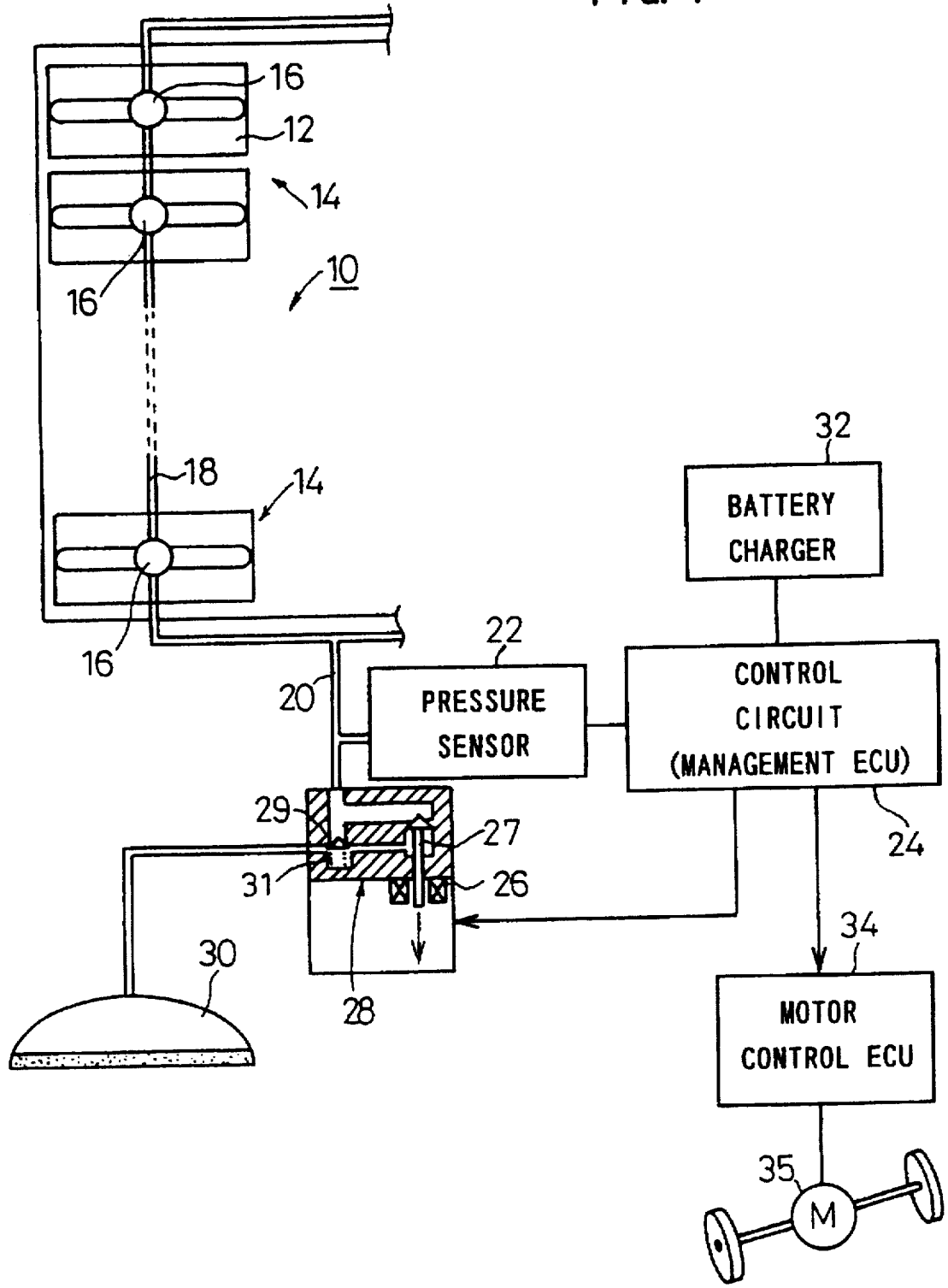
FIG. 1 is a block diagram, partly in plan and cross section, of a battery discharge gas control system according to the present invention.

FIG. 1 shows a battery discharge gas control system 10 according to the present invention, typically installed on an electric vehicle. The battery discharge gas control system 10 includes a battery assembly 14 comprising a plurality of electrically series-connected batter cells 12, typically NiMH battery cells. Each of the battery cells 12 has a gas release port 16 for discharging a hydrogen gas which is generated when it is charged and discharged. The gas release ports 16 of the respective battery cells 12 are interconnected by a passage 18 which is connected to a connecting pipe 20 that is coupled to a pressure sensor 22 for detecting a pressure in the passage 18. The battery discharge gas control system 10 also includes a control circuit (management ECU (electronic control unit)) 24 which is supplied with a detected output signal from the pressure sensor 22 and a control valve 28 which has a solenoid-operated valve 27 magnetically actuatable by a solenoid 26 in response to a control signal outputted from the control circuit 24.

The pressure in the passage 18 is detected by the pressure sensor 22, which applies its detected output signal to the control circuit 24. When the detected gas pressure exceeds a predetermined pressure level, the control circuit 24 outputs a control signal to energize the solenoid 26 for thereby opening the solenoid-operated valve 27. When the solenoid-operated valve 27 is opened, a hydrogen gas generated and discharged by the battery cells 12 passes through the control valve 28, and is discharged out of the battery discharge gas control system 10 through an explosion-resistant filter 30.

The control valve 28 includes a relief valve 29 which is mechanically openable in response to a pressure in the passage 18. When the pressure in the passage 18 exceeds a certain pressure level, even if the solenoid-operated valve 27 fails to operate, the relief valve 29 is opened to discharge the hydrogen gas out of the battery discharge gas control system 10 through the explosion-resistant filter 30. The relief valve 29 is normally closed by a helical spring 31 whose spring force is selected to be greater than a force that is applied by the solenoid 26 to open the solenoid-operated valve 27.

A battery charger 32 for charging the battery assembly 14 is electrically connected to the control circuit 24. When the pressure in the passage 18 is detected by the pressure sensor 22 as having reached the predetermined pressure level, the control circuit 24 turns off the battery charger 32 to cancel any charging process carried out thereby. A motor control ECU 34 for controlling a motor 35 as a propulsion source on the electric vehicle is also electrically connected to the control circuit 24. When the pressure in the passage 18 has reached the predetermined pressure level as detected by the pressure sensor 22, the control circuit 24 controls the motor control ECU 34 to lower a threshold for the discharging voltage of the battery assembly 14.

Figure 2:
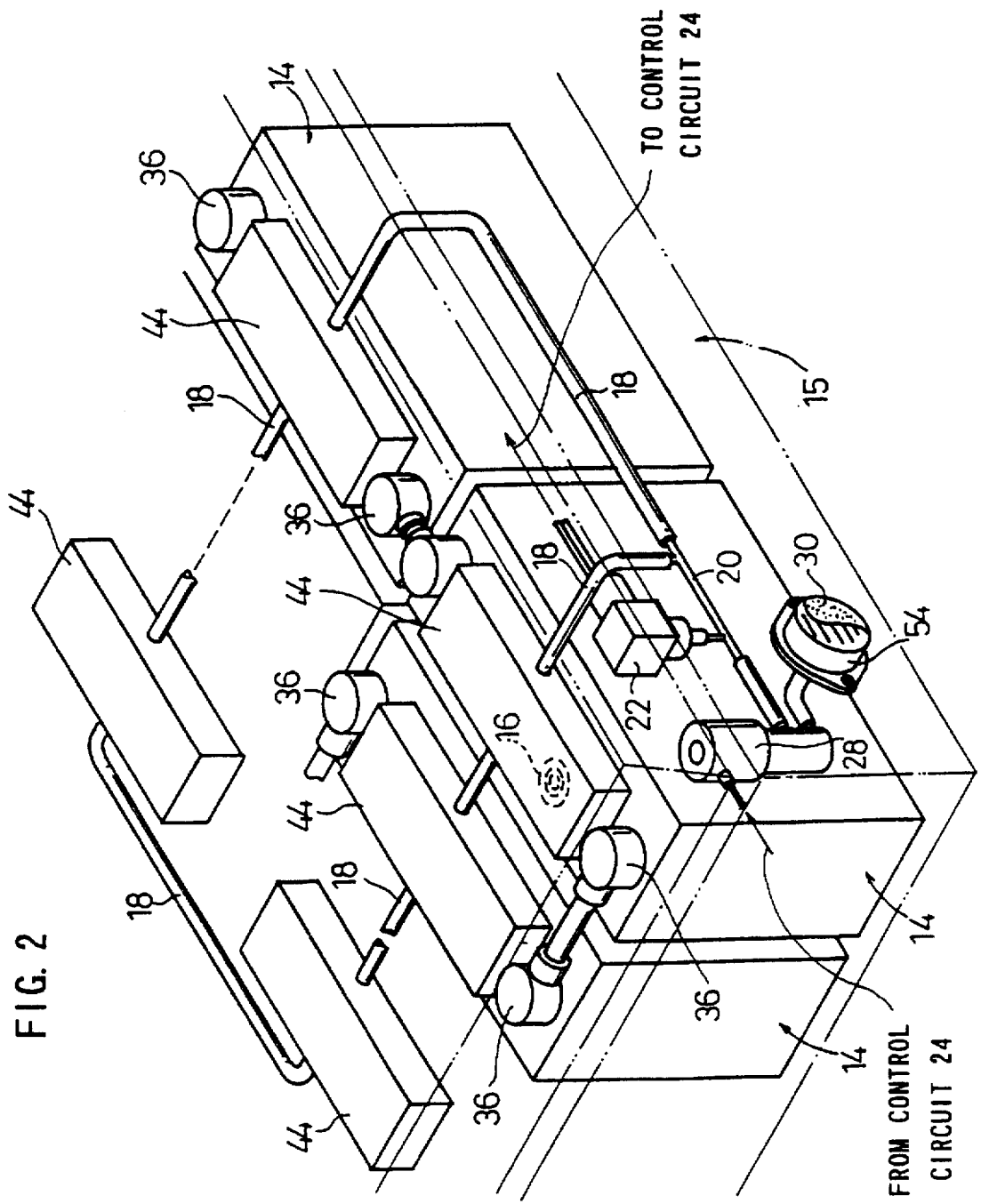
FIG. 2 is a perspective view of a mechanical structure of the battery discharge gas control system shown in FIG. 1.
Figure 3:
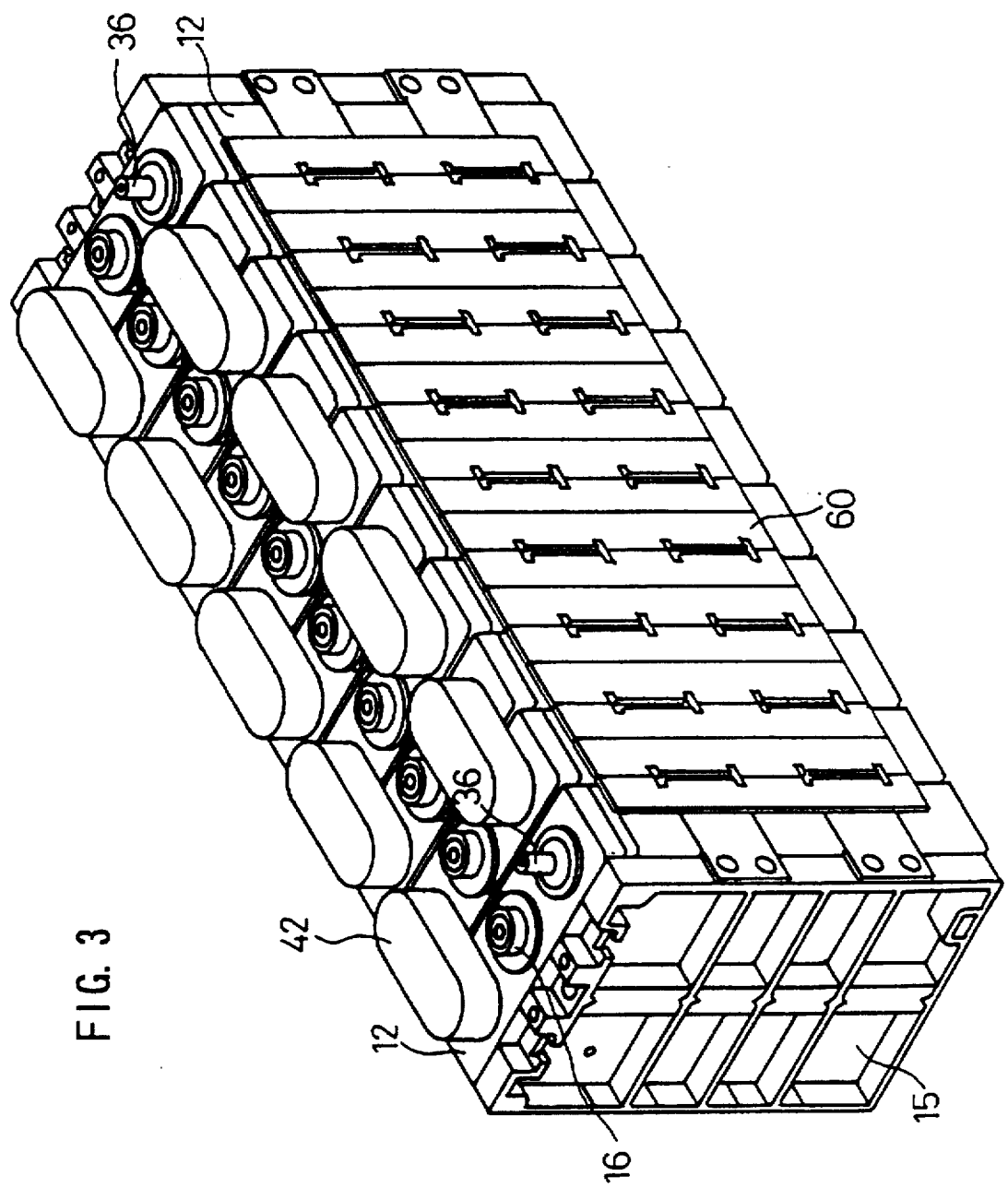
FIG. 3 is a perspective view of battery cells with a gas discharge system removed therefrom.
Figure 4:
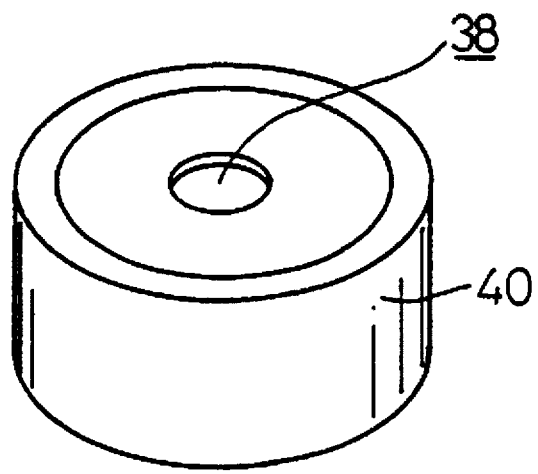
FIG. 4 is a perspective view of a seal member which defines a gas release port of each of the battery cells.

FIG. 2 shows in perspective a mechanical structure of the battery discharge gas control system 10, particularly battery assemblies 14 and a gas discharge system therefor. FIGS. 3 and 4 illustrate each of the battery assemblies 14 with the gas discharge system removed therefrom. In FIG. 2, a plurality of battery assemblies 14, each comprising a plurality of electrically series-connected batter cells 12, are housed in a battery box 15 and electrically interconnected.

As shown in FIG. 3, the battery cells 12 comprise respective single battery elements which are series-connected by electrodes 36. As described above, each of the battery cells 12 has the gas release port 16 for discharging a hydrogen gas which is generated when it is charged and discharged. As shown in FIG. 4 the gas release port 16 comprises a gas discharge hole 38 for discharge a hydrogen gas through a check valve or the like when the gas pressure in the battery cell 12 exceeds a predetermined pressure level, and a cylindrical seal member 40 which defines the gas discharge hole 38 centrally therein.

In FIG. 3, each of the electrodes 36 of the battery cells 12 is covered with an electrode cover 42 which extends between adjacent two of the battery cells 12 and encloses two of the electrodes 36 thereof.

As shown in FIGS. 5 and 6, the gas release ports 16 of the battery cells 12 are connected to each other by the passage 18 which is defined by a stay 44 that extends across and over the battery cells 12 and is housed in the battery box 15. As shown in FIG. 2, the gas release ports 16 of the battery cells 12 of all the battery assemblies 14 which are housed in the battery box 15 are interconnected by the single passage 18.

In FIG. 2, the pressure sensor 22 for detecting the pressure in the passage 18 is connected to the connecting pipe 20 which is coupled to the passage 18. The detected output signal from the pressure sensor 22 is converted by an A/D converter (not shown) into a digital signal which is then applied to the control circuit 24. The control valve 28 which includes the solenoid-operated valve 26 actuatable by a control signal from the control circuit 24 is connected to an end of the connecting pipe 20. The explosion-resistant filter 30 is connected to the control valve 28 and covered with a water-resistant cover 54.

As shown in FIGS. 3, 5, and 6, the battery assembly 14 includes plate-like heat exchangers 60 mounted on sides of the battery cells 12 for radiating heat from the battery cells 12.

Operation of the battery discharge gas control system 10 will be described below with reference to FIGS. 7, 8A, and 8B.

For starting to charge or discharge the battery assembly 14, the control circuit 24 outputs a signal to open the control valve 28 for a predetermined period of time, equalizing the pressure in the passage 18 substantially to the ambient atmospheric pressure. After the predetermined period of time has elapsed, the battery discharge gas control system 10 starts operating upon a timer interrupt or the like. The pressure sensor 22 detects the pressure in the passage 18 in a step ST1, and applies a detected output signal to the control circuit 24 in a step ST2. The control circuit 24, which may comprise a microprocessor or the like as a management ECU, receives the detected output signal from the pressure sensor 22, and determines the pressure in the passage 18 based on the detected output signal from the pressure sensor 22 in a step ST3. If the determined pressure in the passage 18 is lower than 1.2 kg/cm$^2$, for example, then the control circuit 24 decides that it is not necessary to release a hydrogen gas from the passage 18, and brings its control process an end. If the determined pressure in the passage 18 is equal to or higher than 1.2 kg/cm$^2$, then the control circuit 24 generates a control signal to actuate the control valve 28, e.g., a control signal to intermittently actuate the control valve 28. The solenoid-operated valve 27 is now intermittently opened In a step ST4 for thereby discharging a hydrogen gas from the passage 18 through the explosion-resistant filter 30. For example, the control signal generated to intermittently actuate the control valve 28 turns on the solenoid 26 for two seconds and then turns off the solenoid 26 for five seconds in each of successive cycles. Therefore, the operated valve 27 is opened for two seconds and then closed for five seconds in each of successive cycles.

Thereafter, the control circuit 24 detects whether the battery charger 32 is charging the battery assembly 14 or not in a step ST5. The control circuit 24 checks the battery charger 32 because if the battery charger 32 is charging the battery assembly 14 with a hydrogen gas generated, the control circuit 24 can prevent a hydrogen gas from being newly generated by the battery assembly 14 by stopping the charging operation of the battery charger Therefore, if the battery charger 32 is charging the battery assembly 14, then the control circuit 24 stops the charging operation of the battery charger 32 in a step ST8, after which control goes to a step ST7. If the battery charger 32 is not charging the battery assembly 14, the control circuit 24 detects whether the battery assembly 14 is being discharged or not in a step ST6. If the battery assembly is being discharged, then the control circuit 24 limits the amount of electric energy discharged from the battery assembly 14 in a step ST9, and thereafter control goes the step ST7. Specifically, the electric vehicle is usually running when the battery assembly 14 is discharged with a hydrogen gas generated. In order to reduce the amount of hydrogen gas which is generated, the control circuit limits the amount of electric energy discharged from the battery assembly 14 to achieve both running stability of the electric vehicle and hydrogen gas reduction.

If the battery assembly 14 is not being discharged in the step ST6 or after the step ST8 or ST9, then the control circuit 24 issues a warning signal indicating that a hydrogen gas is being discharged from the battery assembly 14. Thereafter, control comes to an end, bringing the battery discharge gas control system 10 back to a state prior to the timer interrupt.

The battery discharge gas control system 10 is capable of discharging a hydrogen gas from the battery assembly 14 for a preset period of time when the battery assembly 14 starts being charged, as shown in FIG. 8A, or when the battery assembly 14 starts being discharged, as shown in FIG. 8B.

Specifically, as shown in FIG. 8A, when the battery assembly 14 starts being charged, the control circuit 24 is activated by an interrupt caused by a charge start signal from the battery charger 32 in a step ST11. Then, the control circuit 24 outputs a control signal to open the control valve 28 in a step ST12. The control signal serves to energize the solenoid 26 to control the control valve 28 to carry out in a predetermined operation, i.e., to open the solenoid-operated valve 27 for a preset period of time for thereby discharging a hydrogen gas from the passage 18.

In a step ST13, the control circuit 24 determines whether the preset period of time has elapsed or not. If the preset period of time has elapsed, then the control circuit 24 outputs a control signal to close the solenoid-operated valve 27 in a step ST14. The solenoid 26 is now de-energized to close the solenoid-operated valve 27 for thereby stopping the discharge of the hydrogen gas from the passage 18.

As shown in FIG. 8A, when the battery assembly 14 starts being discharged, the control circuit 24 is activated by an interrupt caused by a power supply ON signal, e.g., an ignition key signal from the electric vehicle, in a step ST15.

In a step ST16, the control signal 24 detects whether the state of the shift lever of the electric vehicle is a first release from a parking range or not. If the state of the shift lever of the electric vehicle is not a first release from the parking range, then control comes to an end. If the state of the shift lever of the electric vehicle is a first release from the parking range, then the control circuit 24 outputs a control signal to actuate the control valve 28 to open the solenoid-operated valve 27 in a step ST17. Specifically, when the state of the shift lever of the electric vehicle is a first release from the parking range, the battery assembly 14 begins to energize the motor 35. The battery assembly 14 has not been discharged before the state of the shift lever of the electric vehicle is a first release from the parking range. Since the battery assembly 14 starts being discharged possibly generating a hydrogen gas when the state of the shift lever of the electric vehicle is a first release from the parking range, the pressure in the passage 18 is brought back substantially to the ambient atmospheric pressure when the battery assembly 14 starts being discharged. When the battery assembly 14 starts being either charged or discharged, the control valve 28 is closed, and the fluid pressure in the passage 18 which is closed has increased or decreased due to a humidity change after the control valve 28 has finally been closed. Although the pressure in the passage 18 is detected in the step ST3 (see FIG. 7), the accuracy of the detected pressure increases by bringing the pressure in the passage 18 back to the ambient atmospheric pressure when the control process begins. The control signal in the step ST17 serves to energize the solenoid 26 to control the control valve 28 to carry out in a predetermined operation, i.e., to open the solenoid-operated valve 27 for a preset period of time for thereby discharging a hydrogen gas from the passage 18.

In a step ST18, the control circuit 24 determines whether the preset period of time has elapsed or not. If the preset period of time has elapsed, then the control circuit 24 outputs a control signal to close the solenoid-operated valve 27 in a step ST19. The solenoid 26 is now de-energized to close the solenoid-operated valve 27 for thereby stopping the discharge of the hydrogen gas from the passage 18.

As described above, the battery discharge gas control system according to the present invention, which releases a hydrogen gas generated from the battery assembly when the battery assembly is charged and discharged, is capable of keeping the battery structure highly resistant to water or humidity. Specifically, during a period of time in which no hydrogen gas is generated or a generated hydrogen gas is not plenty enough to be released while the battery assembly is being charged or discharged, the passage connected to the gas release ports of the battery cells is closed for thereby keeping the battery structure highly resistant to water or humidity. Since the amount of a hydrogen gas generated per unit time can be reduced, the concentration of a hydrogen gas in the vicinity of the gas release ports can be reduced to a low level. Even in the event of a failure of the solenoid-operated valve, the relief valve, or valve means, is mechanically opened depending on the pressure in the passage to protect the passage from damage. The battery assembly as a whole is thus highly durable.

Although a certain preferred embodiment of the present invention has been shown and described in detail, it should be understood that various changes and modifications may be made therein without departing from the scope of the appended claims.

What is claimed is:

1. A battery discharge gas control system, comprising:
   a battery having a gas release port;

a passage connected to said gas release port;

a control valve connected to said passage;

a pressure sensor for detecting a pressure in said passage; and a control circuit for opening said control valve to release a gas generated by said battery from said passage, depending on the pressure in said passage as detected by said pressure sensor.

2. A battery discharge gas control system according to claim 1, wherein said control circuit has intermittent valve opening output generating means for generating a control signal to intermittently open said control valve.

3. A battery discharge gas control system according to claim 1, wherein said control valve comprises:

a solenoid-operated valve openable in response to a control signal outputted by said control circuit; and valve means mechanically openable depending on the pressure in said passage.

4. A battery discharge gas control system according to claim 2, wherein said control valve comprises:

a solenoid-operated valve openable in response to a control signal outputted by said control circuit; and valve means mechanically openable depending on the pressure in said passage.

5. A battery discharge gas control system according to any one of claims 1 through 4, wherein said control circuit has initial valve opening means for opening said control valve for a predetermined period of time when said battery starts being either charged or discharged.

6. A battery discharge gas control system according to any one of claims 1 through 4, wherein said battery comprises a plurality of battery cells having respective gas release ports, said passage being connected to said gas release ports.

7. A battery discharge gas control system according to claim 5, wherein said battery comprises a plurality of battery cells having respective gas release ports, said passage being connected to said gas release ports.

8. A battery discharge gas control system, comprising:

a battery having a gas release port;

a passage connected to said gas release port;

a control valve connected to said passage; and a control circuit for outputting a control signal to intermittently open said control valve to release a gas generated by said battery from said passage.

9. A battery discharge gas control system according to claim 8, wherein said battery comprises a plurality of battery cells having respective gas release ports, said passage being connected to said gas release ports.

10. A battery discharge gas control system, comprising:

a battery having a gas release port;

a passage connected to said gas release port; and a control valve connected to said passage, said control valve comprising:

a solenoid-operated valve electrically openable depending on the pressure in said passage; and a relief valve which is mechanically openable, said relief valve being normally urged to be closed by a force greater than a force with which said solenoid-operated valve is opened.

11. A battery discharge gas control system according to claim 10, wherein said battery comprises a plurality of battery cells having respective gas release ports, said passage being connected to said gas release ports.

* * * * *